(12) United States Patent
Steiger et al.

(10) Patent No.: US 7,977,451 B2
(45) Date of Patent: *Jul. 12, 2011

(54) POLYARYLETHER MEMBRANES

(75) Inventors: Daniel Steiger, Clifton Park, NY (US);
Gary William Yeager, Rexford, NY (US); Yanshi Zhang, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 438 days.

This patent is subject to a terminal disclaimer.

(21) Appl. No.: 11/611,697

(22) Filed: Dec. 15, 2006

(65) Prior Publication Data
US 2008/0142443 A1    Jun. 19, 2008

(51) Int. Cl.
*C08G 63/44* (2006.01)
(52) U.S. Cl. ............ 528/362; 521/180; 210/321.6
(58) Field of Classification Search ............ 528/188; 510/646
See application file for complete search history.

(56) References Cited

U.S. PATENT DOCUMENTS

| | | | |
|---|---|---|---|
| 4,302,336 A | 11/1981 | Kawaguchi et al. | |
| 4,568,700 A | 2/1986 | Warshawsky et al. | |
| 4,690,766 A | 9/1987 | Linder et al. | |
| 4,833,219 A | 5/1989 | Guiver et al. | |
| 4,834,882 A * | 5/1989 | Kataoka et al. | 210/321.6 |
| 4,874,522 A | 10/1989 | Okamoto et al. | |
| 4,919,811 A | 4/1990 | Davis | |
| 4,971,695 A * | 11/1990 | Bikson et al. | 210/500.41 |
| 4,996,271 A | 2/1991 | Guiver et al. | |
| 5,080,698 A * | 1/1992 | Krizan | 96/14 |
| 5,149,581 A | 9/1992 | Matsuo et al. | |
| 5,202,023 A | 4/1993 | Trimmer et al. | |
| 5,232,601 A | 8/1993 | Chu et al. | |
| 5,256,326 A * | 10/1993 | Kawato et al. | 252/62.54 |
| 5,543,465 A | 8/1996 | Bell et al. | |
| 5,762,798 A | 6/1998 | Wenthold et al. | |
| 5,840,190 A | 11/1998 | Scholander et al. | |
| 5,879,554 A | 3/1999 | Loffelmann et al. | |
| 5,911,880 A | 6/1999 | Klein et al. | |
| 6,103,117 A | 8/2000 | Shimagaki et al. | |
| 6,113,785 A * | 9/2000 | Miura et al. | 210/500.41 |
| 6,432,309 B1 | 8/2002 | Fuke et al. | |
| 6,514,409 B2 | 2/2003 | Kakiuchi et al. | |
| 6,632,361 B2 | 10/2003 | Niklas et al. | |
| 6,673,339 B1 * | 1/2004 | Atala et al. | 424/93.2 |
| 2002/0103306 A1 | 8/2002 | Kerres et al. | |
| 2006/0127728 A1 | 6/2006 | Otsuki et al. | |

FOREIGN PATENT DOCUMENTS

| | | |
|---|---|---|
| DE | 10012332 A1 | 10/2001 |
| DE | 10316318 A1 | 10/2004 |
| DE | 10316323 A1 | 10/2004 |
| EP | 214792 A2 | 3/1987 |
| EP | 506611 A2 | 9/1992 |
| EP | 0997182 A1 | 5/2000 |

(Continued)

OTHER PUBLICATIONS

PCT International Search Report dated Dec. 7, 2007.

(Continued)

*Primary Examiner* — Randy Gulakowski
*Assistant Examiner* — Shane Fang
(74) *Attorney, Agent, or Firm* — Mary Louise Gioeni

(57) ABSTRACT

Membranes for use in methods and apparatuses for hemodialysis and hemofiltration are composed of at least one membrane comprising a polyarylethernitrile having structural units of formula 1, 2, 3 and 4

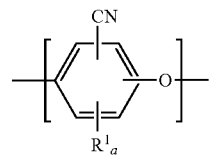

1

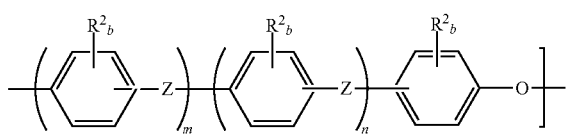

2

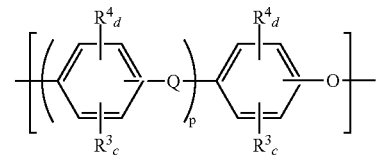

3

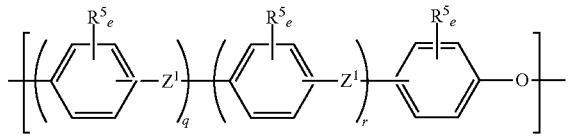

4 wherein
Z is a direct bond, O, S, $CH_2$, SO, $SO_2$, CO, RPO, $CH_2$, alkenyl, alkynyl, a $C_1$-$C_{12}$ aliphatic radical, a $C_3$-$C_{12}$ cycloaliphatic radical, a $C_3$-$C_{12}$ aromatic radical or a combination thereof;
R is a $C_{6-12}$ aromatic radical or a $C_{1-12}$ aliphatic radical;
$R^1$ and $R^2$ are independently H, halo, nitro, a $C_1$-$C_{12}$ aliphatic radical, a $C_3$-$C_{12}$ cycloaliphatic radical, a $C_3$-$C_{12}$ aromatic radical, or a combination thereof;
a is 0, 1, 2 or 3;
b is 0, 1, 2, 3 or 4;
m and n are independently 0 or 1; and
Q and Z are different.

18 Claims, No Drawings

FOREIGN PATENT DOCUMENTS

| EP | 1080777 A1 | 3/2001 |
|---|---|---|
| EP | 1201293 A1 | 5/2002 |
| EP | 1424124 A1 | 6/2004 |
| JP | 04050315 | 2/1992 |
| JP | 07207526 | 8/1995 |
| JP | 2002030125 | 1/2002 |
| WO | 0208301 A2 | 1/2002 |
| WO | WO03049775 A2 | 6/2003 |
| WO | 2004056459 A1 | 7/2004 |
| WO | WO2006051749 A1 | 5/2006 |

OTHER PUBLICATIONS

"Chemically Modified Polysulfone Hollow Fibers with Vinylpyrrolidone Having Improved Blood Compatibility", Akon Higuchi et al., Biomaterials 23 (2002), pp. 2659-2666.

PCT International Search Report dated Jan. 31, 2008.

International Search Report PCT/US2007/074912 mailed Nov. 26, 2007.

International Search Report PCT/US2007/074912 mailed Nov. 26, 2007.

Bottino et al., "Synthesis and Characterization of Pendantly Amine Functionalized Poly(Arylene Ether Sulfone)", Polymer, vol. 34, No. 13, pp. 2901-2902, 1993, XP002463710.

ESP@CENET Abstract JP 2005-066168, Mar. 2005.

ESP@CENET Abstract JP 2006-288414, Jan. 2006.

Search Report of Nov. 26, 2007, PCT/US2007/074912.

Search Report of Jan. 18, 2008, PCT/US20071076218.

* cited by examiner

POLYARYLETHER MEMBRANES

CROSS-REFERENCE TO RELATED APPLICATIONS

The present application is related to U.S. patent application Ser. Nos. 11/567,487 filed Dec. 6, 2006 and 11/611,691 filed Dec. 15, 2006.

BACKGROUND

The invention relates generally to methods and apparatuses for hemodialysis and hemofiltration.

In recent years, porous membranes, either in hollow fiber or flat sheet configurations have found use in hemodialysis and hemofiltration. Hemodialysis membranes are porous membranes permitting the passage of low molecular weight solutes, typically less than 5,000 Daltons, such as urea, creatinine, uric acid, electrolytes and water, yet preventing the passage of higher molecular weight proteins and blood cellular elements. Hemofiltration, which more closely represents the filtration in the glomerulus of the kidney, requires even more permeable membranes allowing complete passage of solutes of molecular weight of less than 50,000 Daltons, and, in some cases, less than 20,000 Daltons. The polymers used in these membranes must possess excellent mechanical properties so as to support the fragile porous membrane structure during manufacture and use. In addition, the polymer must have adequate thermal properties so as not to degrade during high temperature steam sterilization processes. Furthermore these membranes must have excellent biocompatibility, such that protein fouling is minimized and thrombosis of the treated blood does not occur. Though polysulfones have the mechanical and thermal properties necessary for these applications, they are insufficiently hydrophilic. To improve their hydrophilicity, polysulfones have been blended with hydrophilic polymers such as polyvinylpyrollidinone (PVP). However, since PVP is water soluble it is slowly leached from the porous polymer matrix creating product variability. Notwithstanding, the method of blending polysulfone with a hydrophilic polymer such as PVP is a commercially used process for producing hydrophilic porous polysulfone membranes for hemofiltration and hemodialysis.

Thus porous membranes possessing excellent thermal and mechanical properties and excellent biocompatibility for hemodialysis and hemofiltration are desired. In addition, polymers capable of being fabricated into porous membranes that possess sufficient hydrophilicity to obviate the need for blending with a hydrophilic polymers is also desired. Finally polymers which are more hydrophilic than polysulfone yet not water soluble, which may induce hydrophilicity to the porous polysulfone membranes without undesirably leaching from the membrane are also sought.

BRIEF DESCRIPTION

In one aspect, the present invention relates to polyethernitrile block copolymers comprising structural units of formula I

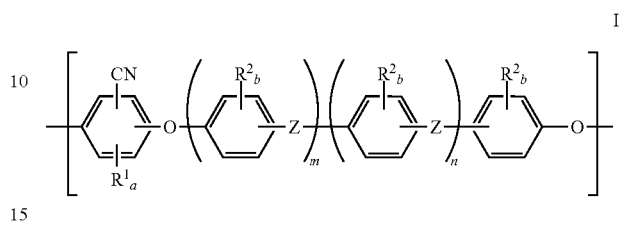

wherein
Z is a direct bond, O, S, $CH_2$, SO, $SO_2$, CO, phenylphosphine oxide or a combination thereof;
$R^1$ and $R^2$ are independently H, halo, cyano, nitro, a $C_1$-$C_{12}$ aliphatic radical, a $C_3$-$C_{12}$ cycloaliphatic radical, a $C_3$-$C_{12}$ aromatic radical, or a combination thereof;
a is 0, 1, 2 or 3;
b is 0, 1, 2, 3 or 4; and
m and n are independently 0 or 1.

In another aspect, the present invention relates to porous membranes composed of the polyarylethernitrile block copolymer of the present invention.

In another aspect, the present invention relates to methods for hemodialysis or hemofiltration, said method comprising contacting blood with a porous membrane according to the present invention. In another aspect, the present invention relates to a dialysis apparatus that includes a plurality of porous hollow fibers composed of the porous membranes of the present invention.

DETAILED DESCRIPTION

Hemodialysis is a process for removing substances through the blood by their unequal penetration through a permeable membrane. Hemodialysis membranes permit the passage of low molecular weight solutes, typically less than 5,000 Daltons, such as urea, creatinine, uric acid, electrolytes and water, but prevent the passage of higher molecular weight proteins and blood cellular elements. Hemofiltration, which more closely represents the filtration in the glomerulus of the kidney, requires more highly permeable membranes which allow complete passage of solutes of molecular weight of less than 50,000 Daltons, and, in some cases, less than 20,000 Daltons. Most dialyzers in use are of a hollow fiber design though designs employing flat sheet membranes are also commercially available with blood and dialysate generally flowing in opposite directions. Both methods comprise contacting blood with a porous hollow fiber membrane.

The porous membranes of the present invention are composed of at least one polyarylethernitrile block copolymer having structural units of formula I. In particular embodiments, the porous membrane may be a hollow fiber or in a flat sheet configuration.

The block copolymers may additionally include at least one block having structural units of formula II

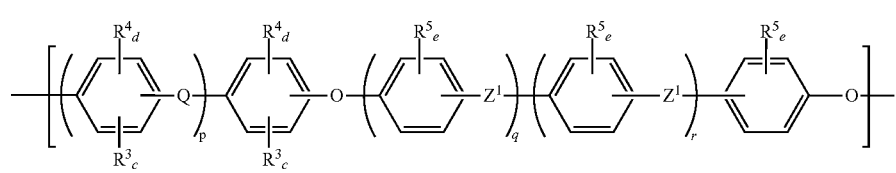

wherein

R$^3$, R$^4$ and R$^5$ are independently H, halo, nitro, a C$_1$-C$_{12}$ aliphatic radical, a C$_3$-C$_{12}$ cycloaliphatic radical, a C$_3$-C$_{12}$ aromatic radical or a combination thereof;

Q is a direct bond, O, S, CH$_2$, alkenyl, alkynyl, a C$_1$-C$_{12}$ aliphatic radical, a C$_3$-C$_{12}$ cycloaliphatic radical, a C$_3$-C$_{12}$ aromatic radical or a combination thereof;

Z$^1$ is a direct bond, O, S, CH$_2$, SO, SO$_2$, CO, RPO or a combination thereof, c, d and e are independently 0, 1, 2, 3 or 4; and p, q and r are independently 0 or 1.

In a particular embodiment, the polyarylethernitrile block copolymer includes structural units of formula IA, and, in yet another particular embodiment, the polyarylethernitrile block copolymer includes structural units of formula IA and IIA

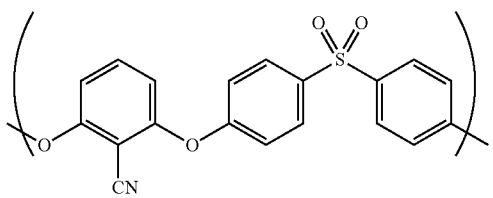

IA and

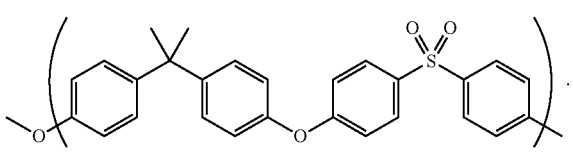

IIA

In another particular embodiment, the polyarylethernitrile block copolymer includes structural units of formula IA, and, in yet another particular embodiment, the polyarylethernitrile block copolymer includes structural units of formula IA and IIAIIB

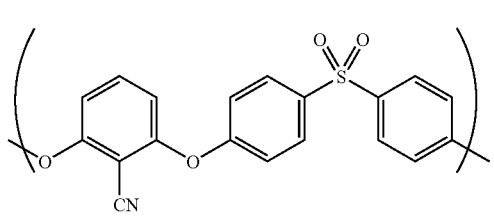

IA

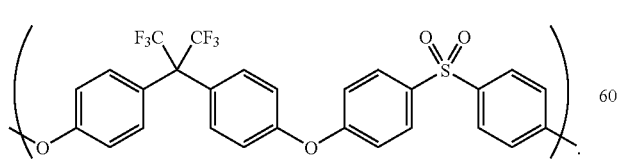

IIB

In another aspect, the present invention relates to membranes composed of random polyarylethernitrile copolymers having structural units of formula 1, 2, 3 and 4

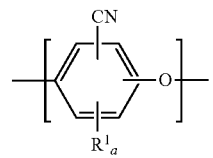

1

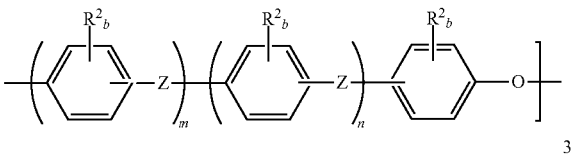

2

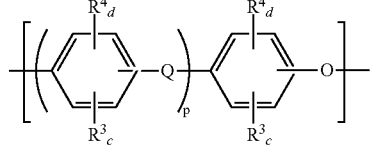

3

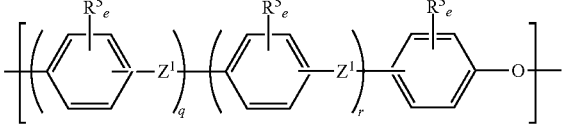

4 wherein

Z is a direct bond, O, S, CH$_2$, SO, SO$_2$, CO, RPO, CH$_2$, a C$_1$-C$_{12}$ aliphatic radical, a C$_3$-C$_{12}$ cycloaliphatic radical, a C$_3$-C$_{12}$ aromatic radical or a combination thereof;

R is a C$_{6-12}$ aromatic radical or a C$_{1-12}$ aliphatic radical;

R$^1$ and R$^2$ are independently H, halo, nitro, a C$_1$-C$_{12}$ aliphatic radical, a C$_3$-C$_{12}$ cycloaliphatic radical, a C$_3$-C$_{12}$ aromatic radical, or a combination thereof;

a is 0, 1, 2 or 3;

b is 0, 1, 2, 3 or 4;

m and n are independently 0 or 1; and

Q and Z are different.

In a particular embodiment, the random polyarylethernitrile copolymer includes structural units of formula 1A, 2A, and 3A

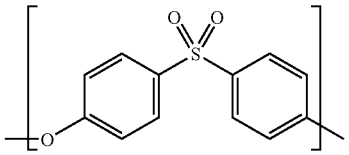

1A

2A

3A

In another particular embodiment, the polyarylethernitrile comprises structural units of formula 1A, 2A, and 3B

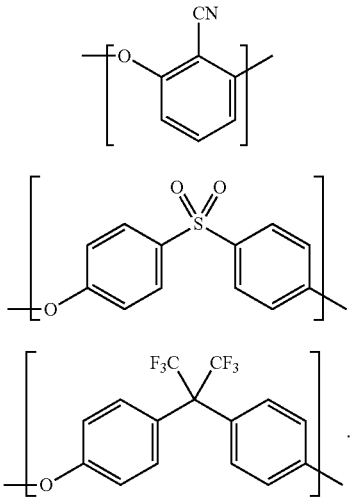

Polyarylethernitriles are typically solvent resistant polymers with high glass transition temperature and/or melting point.

The polyarylethernitrile block copolymers and random polyarylethernitrile copolymers may be produced by reacting at least one dihalobenzonitrile with at least one aromatic dihydroxy compound in a polar aprotic solvent in the presence of an alkali metal compound, and optionally, in the presence of catalysts. Other dihalo aromatic compounds in addition to the dihalobenzonitrile may also be used.

Some examples of the dihalobenzonitrile monomers useful for preparing the polyarylethernitrile block copolymers and random polyarylethernitrile copolymers of the present invention include 2,6-dichlorobenzonitrile, 2,6-difluorobenzonitrile, 2,5-dichlorobenzonitrile, 2,5-difluorobenzonitrile 2,4-dichlorobenzonitrile, and 2,4-difluorobenzonitrile.

Exemplary dihalo aromatic compounds that may be used include 4,4'-bis(chlorophenyl)sulfone, 2,4'-bis(chlorophenyl)sulfone, 2,4-bis(chlorophenyl)sulfone, 4,4'-bis(fluorophenyl)sulfone, 2,4'-bis(fluorophenyl)sulfone, 2,4-bis (fluorophenyl)sulfone, 4,4'-bis(chlorophenyl)sulfoxide, 2,4'-bis(chlorophenyl)sulfoxide, 2,4-bis(chlorophenyl)sulfoxide, 4,4'-bis(fluorophenyl)sulfoxide, 2,4'-bis(fluorophenyl)sulfoxide, 2,4-bis(fluorophenyl)sulfoxide, 4,4'-bis(fluorophenyl)ketone, 2,4'-bis(fluorophenyl)ketone, 2,4-bis(fluorophenyl)ketone, 1,3-bis(4-fluorobenzoyl)benzene, 1,4-bis(4-fluorobenzoyl)benzene, 4,4'-bis(4-chlorophenyl) phenylphosphine oxide, 4,4'-bis(4-fluorophenyl) phenylphosphine oxide, 4,4'-bis(4-fluorophenylsulfonyl)-1,1'-biphenyl, 4,4'-bis(4-chlorophenylsulfonyl)-1,1'-biphenyl, 4,4'-bis(4-fluorophenylsulfoxide)-1,1'-biphenyl, and 4,4'-bis(4-chlorophenylsulfoxide)-1,1'-biphenyl.

Suitable aromatic dihydroxy compounds that may used to make the polyarylethernitrile block copolymers and random polyarylethernitrile copolymers include 4,4'-dihydroxyphenyl sulfone, 2,4'-dihydroxyphenyl sulfone, 4,4'-dihydroxyphenyl sulfoxide, 2,4'-dihydroxyphenyl sulfoxide, bis(3,5-dimethyl-4-hydroxyphenyl) sulfoxide, bis(3,5-dimethyl-4-hydroxyphenyl) sulfone, 4,4-(phenylphosphinyl)diphenol, 4,4'-oxydiphenol,4,4'-thiodiphenol, 4,4'-dihydroxybenzophenone, 4,4'dihydroxyphenylmethane, hydroquinone, resorcinol, 5-cyano-1,3-dihydroxybenzene, 4-cyano-1,3,-dihydroxybenzene, 2-cyano-1,4-dihydroxybenzene, 2-methoxyhydroquinone, 2,2'-biphenol, 4,4'-biphenol, 2,2'-dimethylbiphenol 2,2',6,6'-tetramethylbiphenol, 2,2',3,3',6,6'-hexamethylbiphenol, 3,3',5,5'-tetrabromo-2,2'6,6'-tetramethylbiphenol, 4,4'-isopropylidenediphenol (bisphenol A), 4,4'-isopropylidenebis(2,6-dimethylphenol) (teramethylbisphenol A), 4,4'-isopropylidenebis(2-methylphenol), 4,4'-isopropylidenebis(2-allylphenol), 4,4'-isopropylidenebis(2-allyl-6-methylphenol), 4,4'(1,3-phenylenediisopropylidene)bisphenol (bisphenol M), 4,4'-isopropylidenebis(3-phenylphenol), 4,4'-isopropylidene-bis (2-phenylphenol), 4,4'-(1,4-phenylenediisoproylidene) bisphenol (bisphenol P), 4,4'-ethylidenediphenol (bisphenol E), 4,4'-oxydiphenol, 4,4'-thiodiphenol, 4,4'-thiobis(2,6-dimethylphenol), 4,4'-sufonyldiphenol, 4,4'-sufonylbis(2,6-dimethylphenol) 4,4'-sulfinyldiphenol, 4,4'-hexafluoroisoproylidene)bisphenol (Bisphenol AF), 4,4'-hexafluoroisoproylidene) bis(2,6-dimethylphenol), 4,4'-(1-phenylethylidene)bisphenol (Bisphenol AP), 4,4'-(1-phenylethylidene)bis(2,6-dimethylphenol), bis(4-hydroxyphenyl)-2,2-dichloroethylene (Bisphenol C), bis(4-hydroxyphenyl)methane (Bisphenol-F), bis(2,6-dimethyl-4-hydroxyphenyl)methane, 2,2-bis(4-hydroxyphenyl)butane, 3,3-bis(4-hydroxyphenyl)pentane, 4,4'-(cyclopentylidene) diphenol, 4,4'-(cyclohexylidene)diphenol (Bisphenol Z), 4,4'-(cyclohexylidene)bis(2-methylphenol), 4,4'-(cyclododecylidene)diphenol, 4,4'-(bicyclo[2.2.1]heptylidene) diphenol, 4,4'-(9H-fluorene-9,9-diyl)diphenol, 3,3'-bis(4-hydroxyphenyl)isobenzofuran-1(3H)-one, 1-(4-hydroxyphenyl)-3,3'-dimethyl-2,3-dihydro-1H-inden-5-ol, 1-(4-hydroxy-3,5-dimethylphenyl)-1,3,3',4,6-pentamethyl-2,3-dihydro-1H-inden-5-ol, 3,3,3',3'-tetramethyl-2,2',3,3'-tetrahydro-1,1'-spirobi[indene]-5,6'-diol (Spirobiindane), dihydroxybenzophenone (bisphenol K), thiodiphenol (Bisphenol S), bis(4-hydroxyphenyl) diphenyl methane, bis (4-hydroxyphenoxy)-4,4'-biphenyl, 4,4'-bis(4-hydroxyphenyl)diphenyl ether, 9,9-bis(3-methyl-4-hydroxyphenyl) fluorene, and N-phenyl-3,3-bis-(4-hydroxyphenyl)phthalimide.

In particular embodiments, one of a or b may be 0. In specific embodiments, both a and b are 0, and the polyarylethernitrile block copolymers and random polyarylethernitrile copolymers are composed of unsubstituted structural units, except for the nitrile substituent.

A basic salt of an alkali metal compound may be used to effect the reaction between the dihalo and dihydroxy aromatic compounds, and is not particularly limited so far as it can convert the aromatic dihydroxy compound to its corresponding alkali metal salt. Exemplary compounds include alkali metal hydroxides, such as, but not limited to, lithium hydroxide, sodium hydroxide, potassium hydroxide, rubidium hydroxide, and cesium hydroxide; alkali metal carbonates, such as, but not limited to, lithium carbonate, sodium carbonate, potassium carbonate, rubidium carbonate, and cesium carbonate; and alkali metal hydrogen carbonates, such as but not limited to lithium hydrogen carbonate, sodium hydrogen carbonate, potassium hydrogen carbonate, rubidium hydrogen carbonate, and cesium hydrogen carbonate. Combinations of compounds may also be used to effect the reaction.

Some examples of the aprotic polar solvent that may be effectively used to make the polyarylethernitrile include N,N-dimethylformamide, N,N-diethylformamide, N,N-dimethylacetamide, N,N-diethylacetamide, N,N-dipropylacetamide, N,N-dimethylbenzamide, N-methyl-2-pyrrolidone (NMP), N-ethyl-2-pyrrolidone, N-isopropyl-2-pyrrolidone, N-isobutyl-2-pyrrolidone, N-n-propyl-2-pyrrolidone, N-n-butyl-2-pyrrolidone, N-cyclohexyl-2-pyrrolidone, N-methyl-3-methyl-2-pyrrolidone, N-ethyl-3-methyl-pyrrolidone, N-methyl-3,4,5-trimethyl-2-pyrrolidone, N-methyl-2-piperidone, N-ethyl-2-piperidone, N-isopropyl-2-piperidone, N-methyl-6-methyl-2-piperidone, N-methyl-3-ethylpiperidone, dimethylsulfoxide (DMSO), diethylsulfoxide, sulfolane, 1-methyl-1-oxosulfolane, 1-ethyl-1-oxosulfolane, 1-phenyl-1-oxosulfolane, N,N'-dimethylimidazolidinone (DMI), diphenylsulfone, and combinations thereof. The amount of solvent to be used is typically an amount that is sufficient to dissolve the dihalo and dihydroxy aromatic compounds.

The reaction may be conducted at a temperature ranging from about 100° C. to about 300° C., ideally from about 120 to about 200° C., more preferably about 150 to about 200° C. Often when thermally unstable or reactive groups are present in the monomer and wish to be preserved in the polymer, temperatures in the regime of about 100 to about 120° C., in other embodiments from about 110 to about 145° C. is preferred. The reaction mixture is often dried by addition to the initial reaction mixture of, along with the polar aprotic solvent, a solvent that forms an azeotrope with water. Examples of such solvents include toluene, benzene, xylene, ethylbenzene and chlorobenzene. After removal of residual water by azeotropic drying, the reaction is carried out at the elevated temperatures described above. The reaction is typically conducted for a time period ranging from about 1 hour to about 72 hours, ideally about 1 hour to about 10 hours. Alternatively the bisphenol is converted in an initial step to its dimetallic phenolate salt and isolated and dried. The anhydrous dimetallic salt is used directly in the condensation polymerization reaction with a dihaloaromatic compound in a solvent, either a halogenated aromatic or polar aprotic, at temperatures from about 120 to about 300° C. The reaction may be carried out under ordinary pressure or pressurized conditions.

When halogenated aromatic solvents are used phase transfer catalysts may be employed. Suitable phase transfer catalysts include hexaalkylguanidinium salts and bis-guanidinium salts. Typically the phase transfer catalyst comprises an anionic species such as halide, mesylate, tosylate, tetrafluoroborate, or acetate as the charge-balancing counterion(s). Suitable guanidinium salts include those disclosed in U.S. Pat. Nos. 5,132,423; 5,116,975 and 5,081,298. Other suitable phase transfer catalysts include p-dialkylamino-pyridinium salts, bis-dialkylaminopyridinium salts, bis-quaternary ammonium salts, bis-quaternary phosphonium salts, and phosphazenium salts. Suitable bis-quaternary ammonium and phosphonium salts are disclosed in U.S. Pat. No. 4,554,357. Suitable aminopyridinium salts are disclosed in U.S. Pat. No. 4,460,778; U.S. Pat. No. 4,513,141 and U.S. Pat. No. 4,681,949. Suitable phosphazenium salts are disclosed in U.S. patent application Ser. No. 10/950,874. Additionally, in certain embodiments, the quaternary ammonium and phosphonium salts disclosed in U.S. Pat. No. 4,273,712 may also be used.

The dihalobenzonitrile or mixture of dihalobenzonitriles or mixture of dihalobenzonitrile and a dihalo aromatic compound may be used in substantially equimolar amounts relative to the dihydroxy aromatic compounds or mixture of dihydroxy aromatic compounds used in the reaction mixture. The term "substantially equimolar amounts" means a molar ratio of the dihalobenzonitrile compound(s) to dihydroxy aromatic compound(s) is about 0.85 to about 1.2, preferably about 0.9 to about 1.1, and most preferably from about 0.98 to about 1.02.

After completing the reaction, the polymer may be separated from the inorganic salts, precipitated into a non-solvent and collected by filtration and drying. The drying may be carried out either under vacuum and/or at high temperature, as is known commonly in the art. Examples of non-solvents include water, methanol, ethanol, propanol, butanol, acetone, methyl ethyl ketone, methyl isobutyl ketone, gamma.-butyrolactone, and combinations thereof. Water and methanol are the preferred non-solvents.

The glass transition temperature, $T_g$, of the polymer typically ranges from about 120° C. to about 280° C. in one embodiment, and ranges from about 140° C. to about 200° C. in another embodiment. In some specific embodiments, the $T_g$ ranges from about 140° C. to about 190° C., while in other specific embodiments, the $T_g$ ranges from about 150° C. to about 180° C.

The polyarylethernitrile may be characterized by number average molecular weight ($M_n$) and weight average molecular weight ($M_w$). The various average molecular weights $M_n$ and $M_w$ are determined by techniques such as gel permeation chromatography, and are known to those of ordinary skill in the art. In one embodiment, the $M_n$ of the polymer may be in the range from about 10,000 grams per mole (g/mol) to about 1,000,000 g/mol. In another embodiment, the $M_n$ ranges from about 15,000 g/mol to about 200,000 g/mol. In yet another embodiment, the $M_n$ ranges from about 20,000 g/mol to about 100,000 g/mol. In still a further embodiment the $M_n$ ranges from about 40,000 g/mol to about 80,000 g/mol In some embodiments, the hollow fiber membrane comprises a polyarylethernitrile blended with at least one additional polymer, in particular, blended with or treated with one or more agents known for promoting biocompatibility. The polymer may be blended with the polyarylethernitrile to impart different properties such as better heat resistance, biocompatibility, and the like. Furthermore, the additional polymer may be added to the polyarylethernitrile during the membrane formation to modify the morphology of the phase inverted membrane structure produced upon phase inversion, such as asymmetric membrane structures. In addition, at least one polymer that is blended with the polyarylethernitrile may be hydrophilic or hydrophobic in nature. In some embodiments, the polyarylethernitrile is blended with a hydrophilic polymer.

The hydrophilicity of the polymer blends may be determined by several techniques known to those skilled in the art. One particular technique is that of determination of the contact angle of a liquid such as water on the polymer. It is generally understood in the art that when the contact angle of water is less than about 40-50° C., the polymer is considered to be hydrophilic, while if the contact angle is greater than about 80°, the polymer is considered to be hydrophobic.

One hydrophilic polymer that may be used is polyvinylpyrrolidone (PVP). In addition to, or instead of, polyvinylpyrrolidone, it is also possible to use other hydrophilic polymers which are known to be useful for the production of membranes, such as polyoxazoline, polyethyleneglycol, polypropylene glycol, polyglycolmonoester, copolymers of polyethyleneglycol with polypropylene glycol, water-soluble cellulose derivatives, polysorbate, polyethylene-polypropylene oxide copolymers and polyethyleneimines. PVP may be obtained by polymerizing a N-vinylpyrrolidone using standard addition polymerization techniques known in the art. One such polymerization procedure involves the free radical polymerization using initiators such as azobisisobutyronitrile (AIBN), optionally in the presence of a solvent. PVP is also commercially available under the tradenames PLASDONE® from ISP COMPANY or KOLLIDON® from BASF. Use of PVP in hollow fiber membranes is described in U.S. Pat. Nos. 6,103,117, 6,432,309, 6,432,309, 5,543,465, incorporated herein by reference.

When the membrane comprises a blend of the polyarylethernitrile and PVP, the blend comprises from about 1% to about 80% polyvinylpyrrolidone in one embodiment, preferably 5-50%, and from about 2.5% to about 25% polyvinylpyrrolidone based on total blend components in another embodiment.

PVP may be crosslinked by known methods prior to use to avoid eluting of the polymer with the medium. U.S. Pat. No. 6,432,309, and U.S. Pat. No. 5,543,465, the disclose methods for crosslinking PVP. Some exemplary methods of crosslinking include, but are not limited to, exposing it to heat, radiation such as X-rays, ultraviolet rays, visible radiation, infrared radiation, electron beams; or by chemical methods such as, but not limited to, treating PVP with a crosslinker such as potassium peroxodisulfate, ammonium peroxopersulfate, at temperatures ranging from about 20° C. to about 80° C. in aqueous medium at pH ranges of from about 4 to about 9, and for a time period ranging from about 5 minutes to about 60 minutes. The extent of crosslinking may be controlled, by the use of a crosslinking inhibitor, for example, glycerin, propylene glycol, an aqueous solution of sodium disulfite, sodium carbonate, and combinations thereof.

The hydrophilicity of the polymer blends may be determined by several techniques known to those skilled in the art. One particular technique is that of determination of the contact angle of a liquid such as water on the polymer. It is generally understood in the art that materials exhibiting lower contact angles are considered to be more hydrophilic.

In other embodiments, the polyarylethernitrile is blended with another polymer. Examples of such polymers that may be used include polysulfone, polyether sulfone, polyether urethane, polyamide, polyether-amide, and polyacrylonitrile.

In one particular embodiment, the at least one additional polymer contains an aromatic ring in its backbone and a sulfone moiety as well. These polymers include polysulfones, polyether sulfones or polyphenylenesulfones or copolymers therefrom. Such polymers are described in U.S. Pat. Nos. 4,108,837, 3,332,909, 5,239,043 and 4,008,203. Examples of commercially available polyethersulfones are RADEL R® (a polyethersulfone made by the polymerization of 4,4'-dichlorodiphenylsulfone and 4,4'-biphenol), RADEL A® (PES) and UDEL® (a polyethersulfone made by the polymerization of 4,4'-dichlorodiphenylsulfone and bisphenol A), both available from Solvay Chemicals.

The membranes for use in the methods and apparatus of the present invention may be made by processes known in the art. Several techniques for membrane formation are known in the art, some of which include, but are not limited to: dry-phase separation membrane formation process in which a dissolved polymer is precipitated by evaporation of a sufficient amount of solvent to form a membrane structure; wet-phase separation membrane formation process in which a dissolved polymer is precipitated by immersion in a non-solvent bath to form a membrane structure; dry-wet phase separation membrane formation process which is a combination of the dry and the wet-phase formation processes; thermally-induced phase-separation membrane formation process in which a dissolved polymer is precipitated or coagulated by controlled cooling to form a membrane structure. Further, after the formation of a membrane, it may be subjected to a membrane conditioning process or a pretreatment process prior to its use in a separation application. Representative processes may include thermal annealing to relieve stresses or pre-equilibration in a solution similar to the feed stream the membrane will contact.

Without being bound to theory, it is understood that dialysis works on the principle of the diffusion of solutes across a porous membrane. During dialysis, a feed fluid that is to be purified passes on one side of a membrane, and a dialysis fluid is passed on the other side of the membrane. By altering the composition of the dialysis fluid, a concentration gradient of undesired solutes is formed such that there is a lesser concentration of the undesired solute in the dialysis fluid as compared to the feed fluid. Thus, the undesired solutes will pass through the membrane while the rest of the solutes pass through with the now purified fluid. The membrane may also be designed to have specific pore sizes so that solutes having sizes greater than the pore sizes may not be able to pass through. Pore size refers to the radius of pores in the active layer of the membrane. Pore size of membranes according to the present invention ranges from about 0.5 to about 100 nm, preferably from about 4 to about 50 nm, more preferably from about 4 to about 25 nm, even more preferably from about 4 to about 15 nm, and even more preferably from about 5.5 to about 9.5 nm.

A dialysis apparatus generally comprises a plurality of hollow fiber (HF) membranes that are stacked or bundled together to form a module. The fluid to be purified is fed into the feed line, which is then allowed to pass through the dialysis lines, while coming in contact with the membranes. On the other side of the membranes, the dialysis fluid is allowed to pass. The feed fluid may also be pumped under pressure, thus causing a pressure differential between the feed fluid and the dialysis fluid. During the contact, the concentration gradient between the feed fluid and the dialysis fluid and the membrane pore size causes undesirable solutes to diffuse through the membranes, while the fluid passes through towards the fluid outlet as the permeate, and the undesirable solutes come out through the retentate line. The solutes in the dialysis fluid may be chosen in such a way to effect efficient separation of only specific solutes from the feed fluid.

General methods for preparation of porous hollow fibers and dialysis modules are described in U.S. Pat. No. 6,103,117 incorporated herein by reference. Hemofiltration/hemodialysis modules and their manufacture are also described in U.S. Pat. No. 5,202,023, which is incorporated herein by reference. Fabrication of hemofiltration/hemodialysis modules membranes is also described in U.S. Pat. No. 4,874,522, 5,232,601 5,762,798 5,879,554 and 6,103,117, all of which are incorporated herein by reference.

Hemodialysis is one instance of dialysis wherein blood is purified by using a hemodialysis apparatus. In hemodialysis, a patient's blood is passed through a system of tubing via a machine to the membrane, which has dialysis fluid running on the other side. The cleansed blood is then returned via the circuit back to the body. It is one object of the invention to provide hollow fiber membranes for a hemodialysis unit.

DEFINITIONS

The present invention may be understood more readily by reference to the following detailed description of preferred embodiments of the invention and the examples included therein. In the following specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, furanyl, thienyl, naphthyl, and biphenyl radicals. The aromatic aryl radical may be substituted. Substituents include a member or members selected from the group consisting of F, Cl, Br, I, alkyl, aryl, amide, sulfonamide, hydroxyl, aryloxy, alkoxy, thioalkoxy, thioaryloxy, carbonyl, sulfonyl, carboxylate, carboxylic ester, sulfone, phosphonate, sulfoxide, urea, carbamate, amine, phosphinyl, nitro, cyano, acylhydrazide, hydrazide, imide, imine, amidates, amidines, oximes, peroxides, diazo, and azide.

As used herein the term "aliphatic radical" refers to an organic radical having a valence of at least one consisting of a linear or branched array of atoms both cyclic and non-cyclic. Aliphatic radicals are defined to comprise at least one carbon atom. The array of atoms comprising the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" organic radicals substituted with a wide range of functional groups such as alkyl groups, alkenyl groups, alkynyl groups, F, Cl, Br, I, amide, sulfonamide, hydroxyl, aryloxy, alkoxy, thioalkoxy, thioaryloxy, carbonyl, sulfonyl, carboxylate, carboxylic ester, sulfone, phosphonate, sulfoxide, urea, carbamate, amine, phosphinyl, nitro, cyano, acylhydrazide, hydrazide, imide, imine, amidates, amidines, oximes, peroxides, diazo, azide, and the like. For example, the 4-methyl-pent-1-yl radical is a $C_6$ aliphatic radical comprising a methyl group, the methyl group being a functional group which is an alkyl group. Similarly, the 4-nitrobut-1-yl group is a $C_4$ aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. The polymer may contain or be further functionalized with hydrophilic groups, including hydrogen-bond acceptors that have overall, electrically neutral charge.

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32 etc. are expressly enumerated in this specification. For values that are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Asymmetric membrane refers to a membrane that is constituted of two or more structural planes of non-identical morphologies. Dialysis refers to a process effected by one or more membranes in which transport is driven primarily by pressure differences across the thickness of the one or more membrane. Hemodialysis refers to a dialysis process in which biologically undesired and/or toxic solutes, such as metabolites and by-products are removed from blood. Molecular-weight cutoff refers to the molecular weight of a solute below which about 90% of the solute is rejected for a given membrane.

EXAMPLES

General Methods and Procedures

Chemicals were purchased from Aldrich and Sloss Industries and used as received, unless otherwise noted. All reactions with air- and/or water-sensitive compounds were carried out under dry nitrogen using standard Schlenk line techniques. NMR spectra were recorded on a Bruker Avance 400 ($^1$H, 400 MHz) spectrometer and referenced versus residual solvent shifts. Molecular weights are reported as number average ($M_n$) or weight average ($M_w$) molecular weight and were determined by gel permeation chromatography (GPC) analysis on a Perkin Elmer Series 200 instrument equipped with UV detector. Polystyrene molecular weight standards were used to construct a broad standard calibration curve against which polymer molecular weights were determined. The temperature of the gel permeation column (Polymer Laboratories PLgel 5 μm MIXED-C, 300×7.5 mm) was 40° C. and the mobile phase was chloroform with isopropanol (3.6% v/v). Polymer thermal analysis was performed on a Perkin Elmer DSC7 equipped with a TAC7/DX thermal analyzer and processed using Pyris Software. Glass transition temperatures were recorded on the second heating scan.

Contact angle measurements were taken on a VCA 2000 (Advanced Surface Technology, Inc.) instrument using VCA-optima Software for evaluation. Polymer films were obtained from casting a thin film from an appropriate solution (DMAc, chloroform) onto a clean glass slide and evaporation of the solvent. Advancing contact angles with water (73 Dynes/cm) were determined on both sides of the film (facing air and facing glass slide). Consistently lower values were obtained on the side facing the glass slide presumably due to the smoother surface.

Example 1

Polycyanosulfone (Homopolymer)

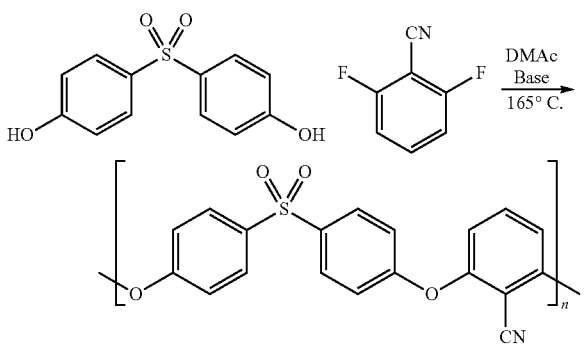

Under nitrogen atmosphere N,N-dimethylacetamide (DMAc) (500 mL) and $K_2CO_3$ (400.08 g, 2.8949 mol) were charged into a 5000 mL-reactor. Bisphenol-S (361.90 g, 1.4460 mol) was added and rinsed in with DMAc (1100 mL). Over the course of 2 days about 2350 mL of toluene was added in portions and distilled out to dry the reaction mixture. Then, 2,6-difluorobenzonitrile (196.85 g, 1.4151 mol) plus more toluene (525 mL) was added. During the subsequent polymerization toluene kept distilling at a constant rate (~2.5 ml/min). After 5 h, the Mw=80 k (PDI=1.6) was high enough and the mixture was diluted with DMAc (3200 mL) and the polymer was drained from the reactor, precipitated into water, filtered and rinsed with water. The resulting white fluffy powder was reslurried with water, filtered and slurried again with methanol. After filtration and drying in the vacuum oven 450 g (89% yield) of a fluffy white powder was obtained.

DSC: $T_g$=227° C.

TGA: 1-2% weight loss up to 450° C., decomposition starts at 460° C., 52% wt loss at 900° C.

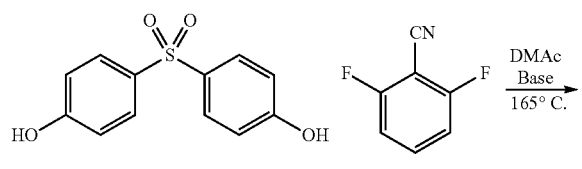

Contact angle: 74° on top, 43° facing glass slide

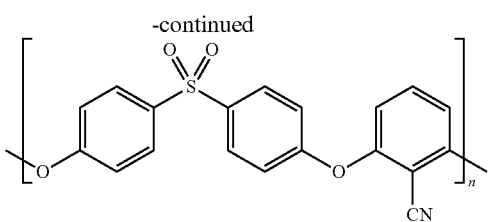

The cyanosulfone DS430 was dissolved in NMP to produce a 20 weight % solids. To one solution there was added 20 weight % Polyvinylpyrollidinone (Mn=100,000). Both solutions were cast onto a glass plate using a 10 mil casting knife. Porous membranes were produced by immersing the films immediately into water.

Example 2

Hydrophobic/Hydrophilic Block Copolymers

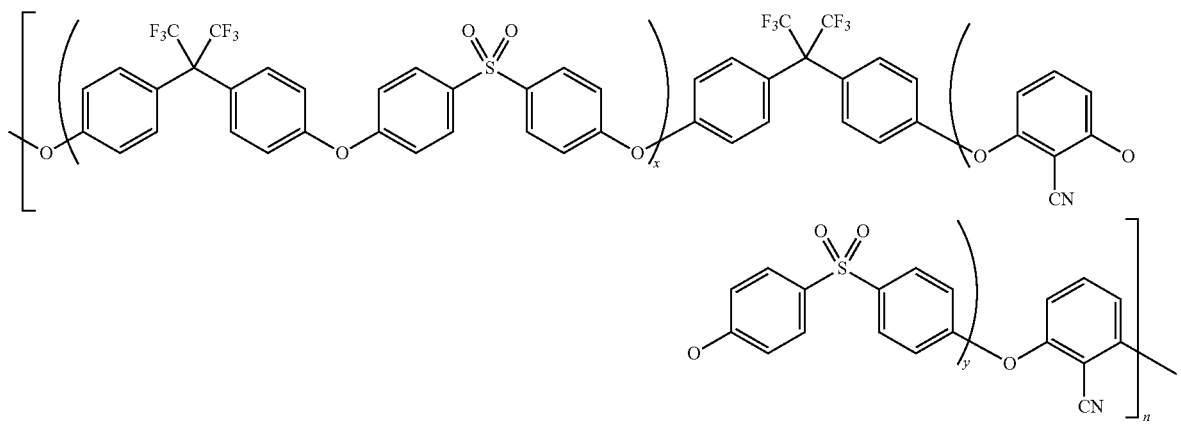

Hexafluorobisphenol A, 2,2-bis(4-hydroxyphenyl) hexafluoropropane, (4.6419 g, 13.8055 mmol), bis(4-fluorophenyl)sulfone (2.8076 g, 11.0424 mmol), K$_2$CO$_3$ (5.7271 g, 41.4389 mmol), dimethyl acetamide (DMAc) (34.6 g) and toluene (18.3 g) were combined in the reaction flask under Argon and immersed into a hot oil bath (150° C.). Under mechanical stirring toluene/water was distilled off and the progress of the polymerization was monitored by GPC. After 6 h, a weight average molecular weight of approximately 10,000 was reached and bisphenol S, bis(4-hydroxyphenyl) sulfone, (3.4550 g, 13.8048 mmol), 2,6-difluorobenzonitrile (2.3050 g, 16.5703 mmol) and some more toluene (15 mL) were added to the mixture. During the course of the polymerizations three more aliquots of toluene (5 mL each) were added to facilitate the removal of water. After a temporary molecular weight drop right after the addition of the second pair of monomers the molecular weight sharply increased until it leveled off at around Mw=41,000.

The polymerization mixture was diluted with DMAc (81 g) and then precipitated in water (2×700 mL), filtered, rinsed with methanol and vacuum oven dried.

DSC: $T_g$=198° C.

Contact angle: 92° on top, 70° facing glass slide

Example 3

Hydrophobic/Hydrophilic Block Copolymer, Longer Blocks

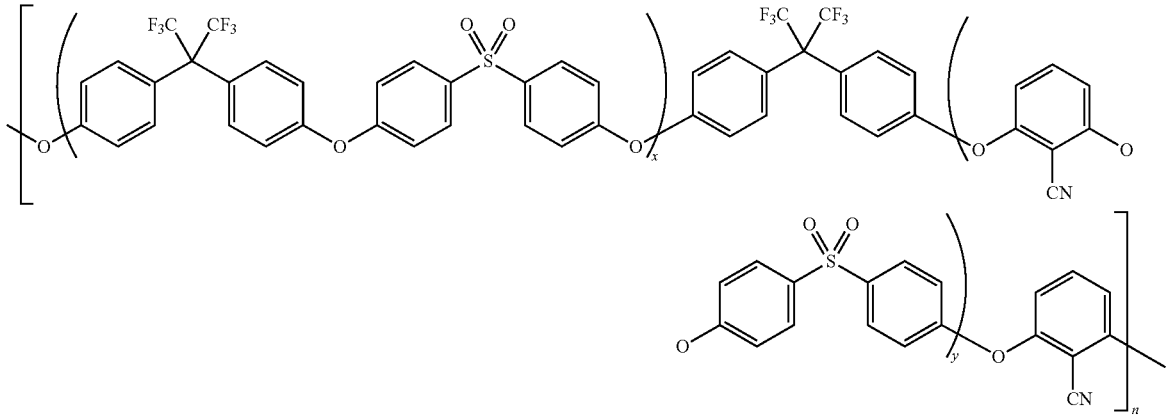

Hexafluorobisphenol A, 2,2-bis(4-hydroxyphenyl)hexafluoropropane, (5.0546 g, 15.0330 mmol), bis(4-fluorophenyl)sulfone (3.4405 g, 13.5316 mmol), K$_2$CO$_3$ (6.2400 g, 45.1501 mmol), dimethyl acetamide (DMAc) (41 g) and toluene (23 mL) were combined in the reaction flask under nitrogen and immersed into a hot oil bath (155° C.). Under mechanical stirring toluene/water was distilled off and the progress of the polymerization was monitored by GPC. After 6 h, a weight average molecular weight of approximately 14,000 was reached and bisphenol S, bis(4-hydroxyphenyl)sulfone, (3.6960 g, 14.7678 mmol), 2,6-difluorobenzonitrile (2.2677 g, 16.3021 mmol) and some more toluene were added to the mixture. During the course of the polymerizations more aliquots of toluene were added to facilitate the removal of water. After the addition of the second pair of monomers the molecular weight sharply increased until it leveled off at around Mw=68,000 (PDI=6.1).

The polymerization mixture was cooled to 80° C., diluted with DMAc (92 g) and then precipitated in water (2×800 mL), filtered, rinsed with ethanol and vacuum oven dried.
DSC: T$_g$=208° C.
Contact angle: 90° on top, 59° facing glass slide

Example 4

Hydrophobic/Hydrophilic Block Copolymer

Bisphenol A, 2,2-bis(4-hydroxyphenyl)propane, (25.6187 g, 0.1122 mol), bis(4-chlorophenyl)sulfone (27.6595 g, 0.09632 mol), K$_2$CO$_3$ (33.4053 g, 0.2417 mol), dimethylsulfoxide (DMSO) (190.5 g) and toluene (100 mL) were combined in the reaction flask under nitrogen and immersed into a hot oil bath (170° C.). Under mechanical stirring toluene/water was distilled off and the progress of the polymerization was monitored by GPC. Two more aliquots of toluene (50 mL each) were added after 49 and 195 minutes to facilitate the removal of water. After 7 h, a constant weight average molecular weight of approximately 8,500 was reached. The mixture was cooled to room temperature[1] and bisphenol S, bis(4-hydroxyphenyl)sulfone, (12.0352 g, 0.048088 mol), 2,6-difluorobenzonitrile (8.9192 g, 0.06412 mol) and more toluene (100 mL) were added to the mixture. The mixture was slowly heated back to 170° C. to make sure the distillation of toluene/water was not too vigorous. After the addition of the second pair of monomers the molecular weight sharply increased until it leveled off at around Mw=190,000 (PDI=12.4).

The polymerization mixture was cooled and diluted with DMSO (355 mL) and then precipitated into water, filtered, rinsed with water and vacuum oven dried at 70° C. A light yellow fluffy powder was obtained (63.7 g). The latter was redissolved in chloroform (595 g) and precipitated into MeOH (2×2000 mL) to give an almost white precipitate. After air-drying for 24 h and vacuum oven (at 70° C.) drying for 3 days 53.2 g (82%) of an off-white powder were obtained.
DSC: T$_g$=202° C.
Contact angle: 70° (top); 46° (facing glass)

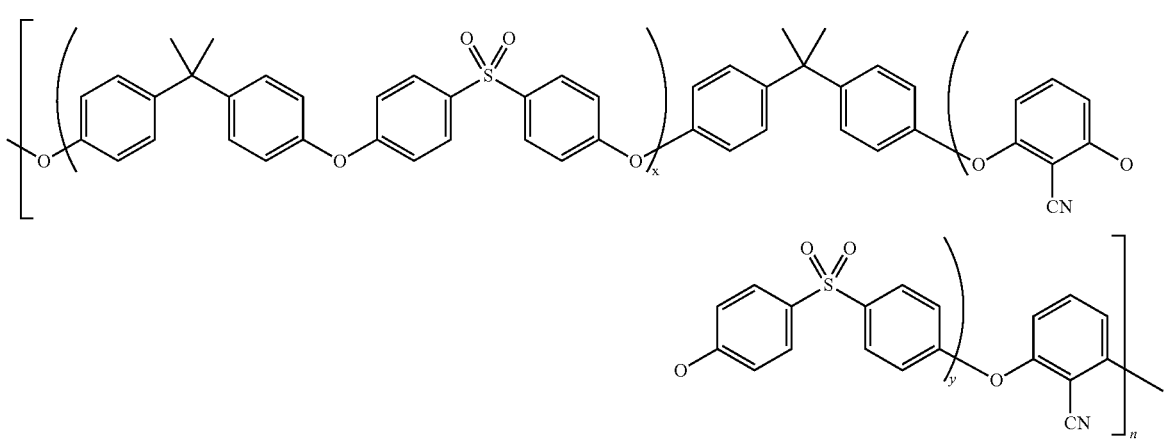

Example 5

Hydrophobic/Hydrophilic Block Copolymer

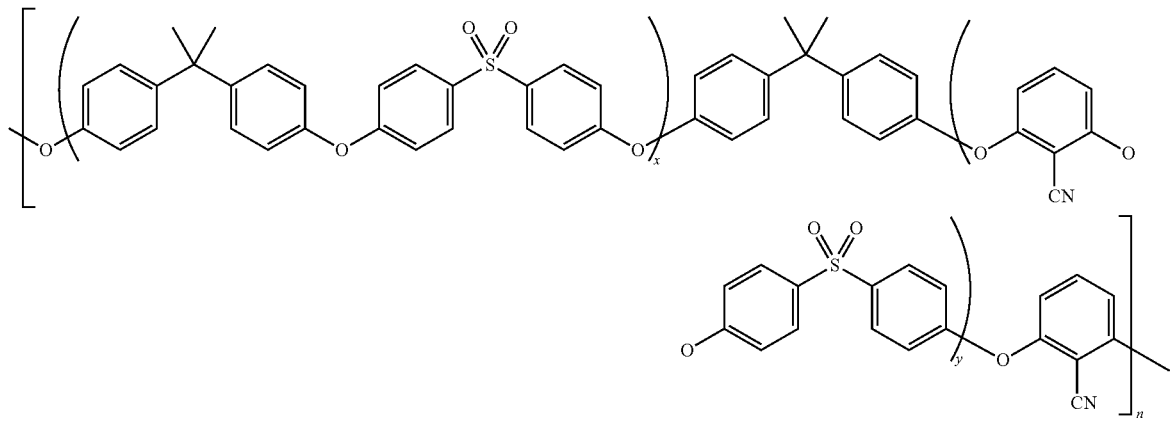

Bisphenol A, 2,2-bis(4-hydroxyphenyl)propane, (15.0089 g, 65.7447 mmol), bis(4-chlorophenyl)sulfone (14.1515 g, 49.2799 mmol), $K_2CO_3$ (34.1051 g, 0.2468 mmol), dimethylsulfoxide (DMSO) (177 g) and toluene (100 ML) were combined in the reaction flask under nitrogen and immersed into a hot oil bath (140° C.). (Warning: If bisphenol-S is added at 170° C. a very intense gas evolution/foaming occurs leading to an uncontrollable situation.) Under mechanical stirring the mixture was slowly heated to 170° C. over the course of 7 hours. Toluene/water was distilled off and the progress of the polymerization was monitored by GPC. After 9 h, a constant weight average molecular weight of approximately 4,700 was reached. The mixture was cooled to room temperature and bisphenol S, bis(4-hydroxyphenyl)sulfone, (24.6847 g, 98.6303 mmol), 2,6-difluorobenzonitrile (16.0088 g, 115.0848 mmol) and more toluene were added to the mixture. The mixture was slowly heated back to 170° C. to make sure the distillation of toluene/water was not too vigorous. After the addition of the second pair of monomers the molecular weight slightly dropped but then immediately sharply increased until it leveled off at around Mw=65,000 (PDI=4.9).

The polymerization mixture was cooled and diluted with DMSO (343 mL) and then precipitated into water (2×2000 mL), filtered, rinsed with water and air dried for 24 hours. After vacuum oven dried at 70° C. for three days a fluffy powder was obtained (60.5 g).
DSC: $T_g$=212° C.
Contact angle: 72° (top); 31° (facing glass)

Example 6

Random Copolymer

Under nitrogen atmosphere into a 500 mL-reactor, bisphenol-S (19.176 g, 84 mmol) and BPA (9.010 g, 36 mmol) were added, which was followed by the addition of tetramethylene sulfone (95 mL), toluene (100 ml), and $K_2CO_3$ (24.9 g, 180 mmol). The reaction mixture was heated at 180° C. for 8 h to distill the toluene. Bis(4-chlorophenyl)sulfone (20.676 g, 72 mmol) and difluorobenzonitrile (6.677 g, 48 mmol) were added. The reaction temperature was increased to 210° C. After 15 h, the Mw=56 k (PDI=3.8) was high enough and the mixture was diluted with DMAc (150 mL). The solution was precipitated in water, and rinsed with water. The resulting white fluffy powder was reslurried with water, filtered and slurried again with methanol. After filtration and drying in the vacuum oven a fluffy white powder was obtained.
DSC: $T_g$=199° C.
Contact angle: 72° (top); 39° (facing glass)

Example 7

Random Copolymer

Under nitrogen atmosphere into a 500 mL-reactor, bisphenol-S (18.019 g, 72 mmol) and BPA (10.958 g, 48 mmol) were added, which was followed by the addition of tetramethylene sulfone (80 mL), toluene (100 ml), and $K_2CO_3$ (24.9 g, 180 mmol). The reaction mixture was heated at 180° C. for 8 h to distill the toluene. Bis(4-fluorophenyl)sulfone (9.153 g, 36 mmol) and difluorobenzonitrile (11.685 g, 84 mmol) were added. The reaction temperature was increased to 220° C. After 15 h, the Mw=40 k (PDI=2.6) was reached and the mixture was diluted with DMAc (150 mL). The solution was precipitated in water, and rinsed with water. The resulting white fluffy powder was reslurried with water, filtered and slurried again with methanol. After filtration and drying in the vacuum oven a fluffy white powder was obtained.
DSC: $T_g$=209° C.
Contact angle: 70° (top); 35° (facing glass)

Example 8

Blood Compatibility

Polymer samples 1-5 were fabricated into flat sheet membranes and tested for contact angle.

Samples #1 through #4 are copolymers using "hydrophobic monomers" (Bisphenol-A, BPA & dichlorodiphenyl sulfone, DCDPS) and "hydrophilic monomers" (Bisphenol-S, BPS & 2,6-difluorobenzonitrile, DFBN). Polymers #1 and #2 were polymerized in a stepwise manner so that block copolymers were obtained featuring hydrophobic and hydrophilic blocks as evidenced by NMR spectroscopy. Samples #3 and #4 have the same monomer composition as #1 and #2, respectively. However the hydrophobic and hydrophilic monomers in the polymer chain were arranged randomly.

The following table is a summary of monomer composition, polymer architectures, contact angles, indicative of the degree of blood compatibility:

|  | Sample | | | | | |
| --- | --- | --- | --- | --- | --- | --- |
|  | #1 | #2 | #3 | #4 | #5 | #6 |
| Architecture | Block | Block | Random | Random | Random | Blend (1/1) |
| BPA | 70% | 40% | 70% | 40% | — | — |
| BPS | 30% | 60% | 30% | 60% | 100% | 100% |
| DCDPS | 60% | 30% | 60% | 30% | — | 50% |
| DFBN | 40% | 70% | 40% | 70% | 100% | 50% |
| Hydrophobic block Mw | 8,500 | 4,600 | — | — | — | — |
| End Mw | 190,000 | 64,000 | 56,000 | 40,000 | 80,000 | — |
| $T_g$ [° C.] | 202 | 212 | 199 | 209 | 225 | 224 (est) |
| Contact angle | 46° | 31° | 40-50° | 30-40° | 30-40° | — |

In order to achieve blood compatibility a contact angle of less than 40-50° C. is desirable.

It is believed that polymers having microdomains can reduce cell adhesion and protein and cell activation when contacted with blood. Such microdomain structures can be achieved by introducing block copolymers that have hydrophilic and hydrophobic blocks. A microdomain structure of block copolymer can offer an optimal condition that can reduce the undesirable effects of hydrophobic surface that have strong adsorption of proteins and cells. It also reduces undesirable effects caused by hydrophilic surfaces for example platelet adhesion and complement activation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A membrane for hemodialysis and hemofiltration having a pore size between about 0.5 nm and 100 nm comprising a polyarylethernitrile having a contact angle with water of less than about 50° measured on a surface of the copolymer cast as a film on a glass substrate and having structural units of formula 1, 2, 3 and 4

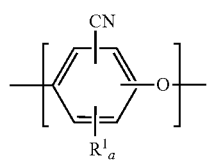

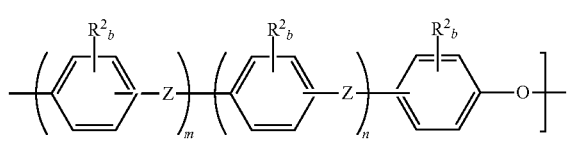

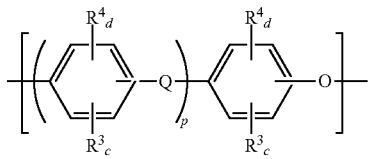

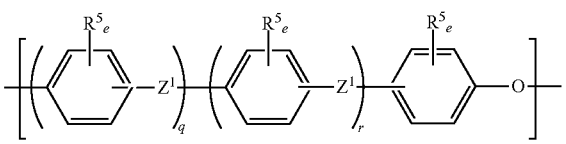

wherein

Z is a direct bond, O, S, SO, $SO_2$, CO, RPO, alkenyl, alkynyl, a $C_1$-$C_{12}$ aliphatic radical, a $C_3$-$C_{12}$ cycloaliphatic radical, a $C_3$-$C_{12}$ aromatic radical or a combination thereof;

R is a $C_{6-12}$ aromatic radical or a $C_{1-12}$ aliphatic radical;

$R^1$ and $R^2$ are independently H, halo, nitro, a $C_1$-$C_{12}$ aliphatic radical, a $C_3$-$C_{12}$ cycloaliphatic radical, a $C_3$-$C_{12}$ aromatic radical, or a combination thereof;

a is 0, 1, 2 or 3;

b is 0, 1, 2, 3 or 4;

m and n are independently 0 or 1;

Q and Z are different;

$R^3$, $R^4$ and $R^5$ are independently H, halo, nitro, a $C_1$-$C_{12}$ aliphatic radical, a $C_3$-$C_{12}$ cycloaliphatic radical, a $C_3$-$C_{12}$ aromatic radical or a combination thereof;

Q is a direct bond, O, S, alkenyl, alkynyl, a $C_1$-$C_{12}$ aliphatic radical, a $C_3$-$C_{12}$ cycloaliphatic radical, a $C_3$-$C_{12}$ aromatic radical or a combination thereof;

$Z^1$ is a direct bond, O, S, $CH_2$, SO, $SO_2$, CO, RPO or a combination thereof;

c, d and e are independently 0, 1, 2, 3 or 4;

p, q and r are independently 0 or 1; and said polyarylethernitrile has a benzonitrile content of between about 20 and 35 mol %; and the remaining between about 65 and 80 mol % of said polyarylethernitrile is made up of Bisphenol-A and Bisphenol-S residues.

2. A membrane according to claim 1, wherein the polyarylethernitrile comprises structural units of formula 1A, 2A, and 3A

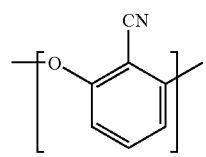

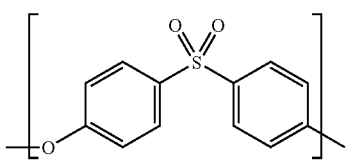

-continued

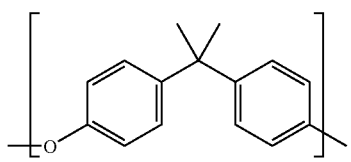
3A

3. A membrane according to claim 1, wherein the polyarylethernitrile comprises structural units of formula 1A, 2A, and 3B

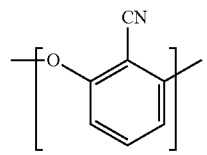
1A

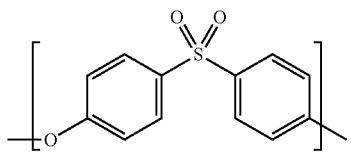
2A

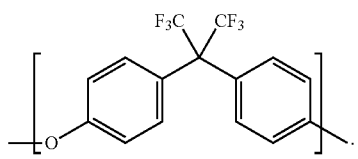
3B

4. A membrane according to claim 1, having a hollow fiber configuration.

5. A hollow fiber module comprising a plurality of membranes according to claim 4.

6. A method for hemodialysis and hemofiltration, said method comprising contacting blood with a membrane having a pore size between about 0.5 nm and 100 nm comprising at least one polyarylethernitrile having a contact angle with water of less than about 50° measured on a surface of the copolymer cast as a film on a glass substrate and having structural units of formula 1, 2, 3 and 4

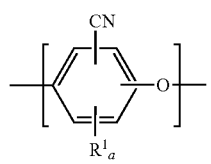
1

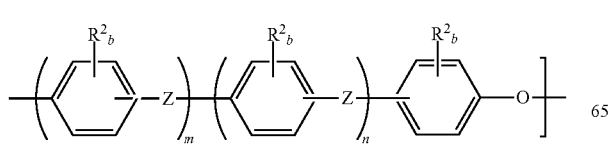
2

-continued

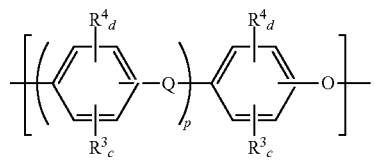
3

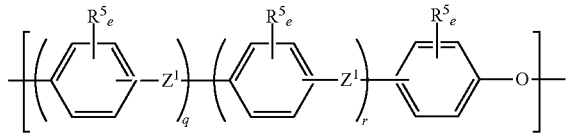
4 wherein

Z is a direct bond, O, S, SO, $SO_2$, CO, RPO, alkenyl, alkynyl, a $C_1$-$C_{12}$ aliphatic radical, a $C_3$-$C_{12}$ cycloaliphatic radical, a $C_3$-$C_{12}$ aromatic radical or a combination thereof;

R is a $C_{6-12}$ aromatic radical or a $C_{1-12}$ aliphatic radical;

$R^1$ and $R^2$ are independently H, halo, nitro, a $C_1$-$C_{12}$ aliphatic radical, a $C_3$-$C_{12}$ cycloaliphatic radical, a $C_3$-$C_{12}$ aromatic radical, or a combination thereof;

a is 0, 1, 2 or 3;

b is 0, 1, 2, 3 or 4;

m and n are independently 0 or 1;

Q and Z are different;

$R^3$, $R^4$ and $R^5$ are independently H, halo, nitro, a $C_1$-$C_{12}$ aliphatic radical, a $C_3$-$C_{12}$ cycloaliphatic radical, a $C_3$-$C_{12}$ aromatic radical or a combination thereof;

Q is a direct bond, O, S, alkenyl, alkynyl, a $C_1$-$C_{12}$ aliphatic radical, a $C_3$-$C_{12}$ cycloaliphatic radical, a $C_3$-$C_{12}$ aromatic radical or a combination thereof;

$Z^1$ is a direct bond, O, S, $CH_2$, SO, $SO_2$, CO, RPO or a combination thereof;

c, d and e are independently 0, 1, 2, 3 or 4;

p, q and r are independently 0 or 1; and said polyarylethernitrile has a benzonitrile content of between about 20 and 50 mol %; and the remaining between about 50 and 80 mol % of said polyarylethernitrile is made up of Bisphenol-A and Bisphenol-S residues.

7. A method according to claim 6, wherein the polyarylethernitrile comprises structural units of formula 1A, 2A, and 3A

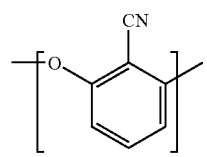
1A

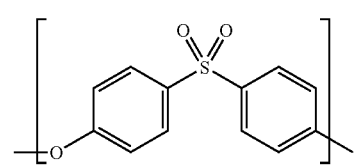
2A

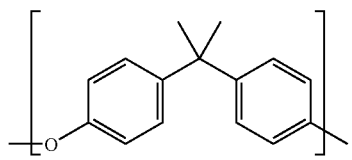
3A

8. A method according to claim 6, wherein the polyarylethernitrile comprises structural units of formula 1A, 2A, and 3B

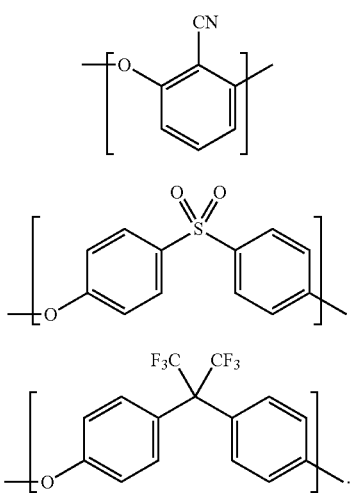

1A

2A

3B

9. A membrane according to claim 1, wherein the membrane has a hollow fiber configuration.

10. A dialysis apparatus comprising at least one membrane having a pore size between about 0.5 nm and 100 nm comprising a polyarylethernitrile having a contact angle with water of less than about 50° measured on a surface of the copolymer cast as a film on a glass substrate and having structural units of formula 1, 2, 3 and 4

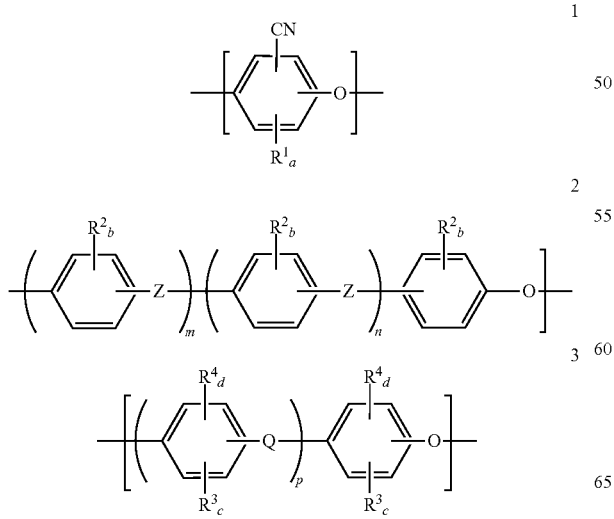

1

2

3

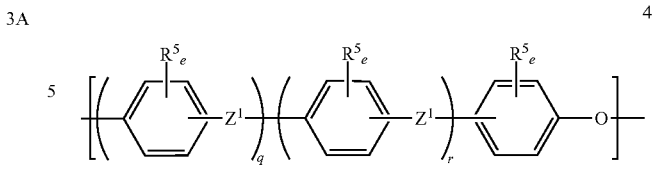

4 wherein
Z is a direct bond, O, S, SO, $SO_2$, CO, RPO, alkenyl, alkynyl, a $C_1$-$C_{12}$ aliphatic radical, a $C_3$-$C_{12}$ cycloaliphatic radical, a $C_3$-$C_{12}$ aromatic radical or a combination thereof;
R is a $C_{6-12}$ aromatic radical or a $C_{1-12}$ aliphatic radical;
$R^1$ and $R^2$ are independently H, halo, nitro, a $C_1$-$C_{12}$ aliphatic radical, a $C_3$-$C_{12}$ cycloaliphatic radical, a $C_3$-$C_{12}$ aromatic radical, or a combination thereof;
a is 0, 1, 2 or 3;
b is 0, 1, 2, 3 or 4;
m and n are independently 0 or 1;
Q and Z are different;
$R^3$, $R^4$ and $R^5$ are independently H, halo, nitro, a $C_1$-$C_{12}$ aliphatic radical, a $C_3$-$C_{12}$ cycloaliphatic radical, a $C_3$-$C_{12}$ aromatic radical or a combination thereof;
Q is a direct bond, O, S, alkenyl, alkynyl, a $C_1$-$C_{12}$ aliphatic radical, a $C_3$-$C_{12}$ cycloaliphatic radical, a $C_3$-$C_{12}$ aromatic radical or a combination thereof;
$Z^1$ is a direct bond, O, S, $CH_2$, SO, $SO_2$, CO, RPO or a combination thereof;
c, d and e are independently 0, 1, 2, 3 or 4; and
p, q and r are independently 0 or 1.

11. A dialysis apparatus according to claim 10, wherein the polyarylethernitrile comprises structural units of formula 1A, 2A, and 3A

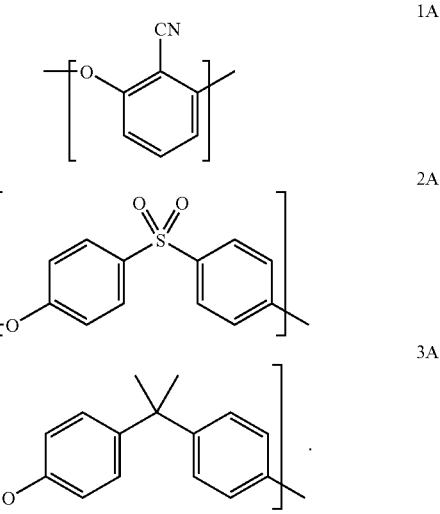

1A

2A

3A

12. A dialysis apparatus according to claim 10, wherein the polyarylethernitrile comprises structural units of formula 1A, 2A, and 3B

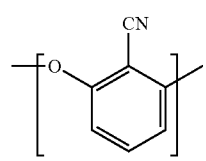

1A

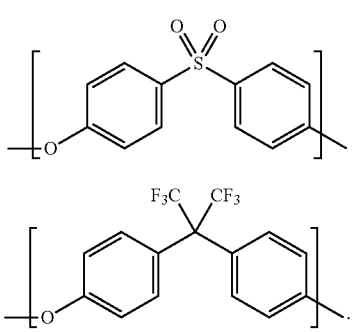

13. A dialysis apparatus according to claim 10, having a hollow fiber configuration.

14. A dialysis apparatus according to claim 10, comprising a plurality of the membranes.

15. The membrane of claim 1 wherein the membrane has a pore size of between about 4 nm and 25 nm.

16. The membrane of claim 15 wherein the membrane has a pore size of between about 4 nm and 15 nm.

17. The method of claim 6 wherein the membrane has a pore size of between about 4 nm and 25 nm.

18. The method of claim 17 wherein the membrane has a pore size of between about 4 nm and 15 nm.

* * * * *